(12) United States Patent
Devries

(10) Patent No.: US 7,395,781 B2
(45) Date of Patent: Jul. 8, 2008

(54) DEVICE FOR INSERTING AND REMOVING MILKING MACHINE LINERS

(76) Inventor: Oren H. Devries, 3178 S. 2000 East, Wendell, ID (US) 83355-3517

( * ) Notice: Subject to any disclaimer, the term of this patent is extended or adjusted under 35 U.S.C. 154(b) by 339 days.

(21) Appl. No.: 11/205,547

(22) Filed: Aug. 16, 2005

(65) Prior Publication Data

US 2007/0039551 A1 Feb. 22, 2007

(51) Int. Cl.
*A01J 5/04* (2006.01)
(52) U.S. Cl. .................................................. 119/14.47
(58) Field of Classification Search .............. 119/14.47, 119/14.01, 14.02, 14.03, 14.1, 14.08, 14.18, 119/14.46, 14.48, 14.49; 29/235, 235.5, 29/426.6
See application file for complete search history.

(56) References Cited

U.S. PATENT DOCUMENTS

| 4,315,480 | A | 2/1982 | Noorlander |
| 4,459,938 | A | 7/1984 | Noorlander |
| 4,610,220 | A | 9/1986 | Goldberg et al. |
| 4,842,248 | A | 6/1989 | Shy |
| 5,007,378 | A | 4/1991 | Larson |
| 5,405,290 | A | 4/1995 | Chuang |
| 5,701,649 | A | 12/1997 | Reesor et al. |
| 5,931,116 | A | 8/1999 | Van Staalduinen |
| 6,216,326 | B1 | 4/2001 | Ritter et al. |
| 6,427,624 | B1 | 8/2002 | Briggs et al. |
| D480,184 | S | 9/2003 | Brown |
| 6,789,501 | B2 | 9/2004 | Brown |

*Primary Examiner*—T. Nguyen
(74) *Attorney, Agent, or Firm*—Stephen M. Nipper; Derek H. Maughan; Dykas, Shaver & Nipper, LLP

(57) ABSTRACT

A device for selectively inserting or removing cup liners having a generally elongated cylindrical body, a front cup and a rear lip from a milking cup apparatus. The device having a frame, a force-applying device pivotally connected to the frame and a liner holding device, connected in sliding engagement to the frame. The liner holding device is configured to connect with the liner and to pull the liner through the hard milk shell cup when activated by a user.

14 Claims, 3 Drawing Sheets

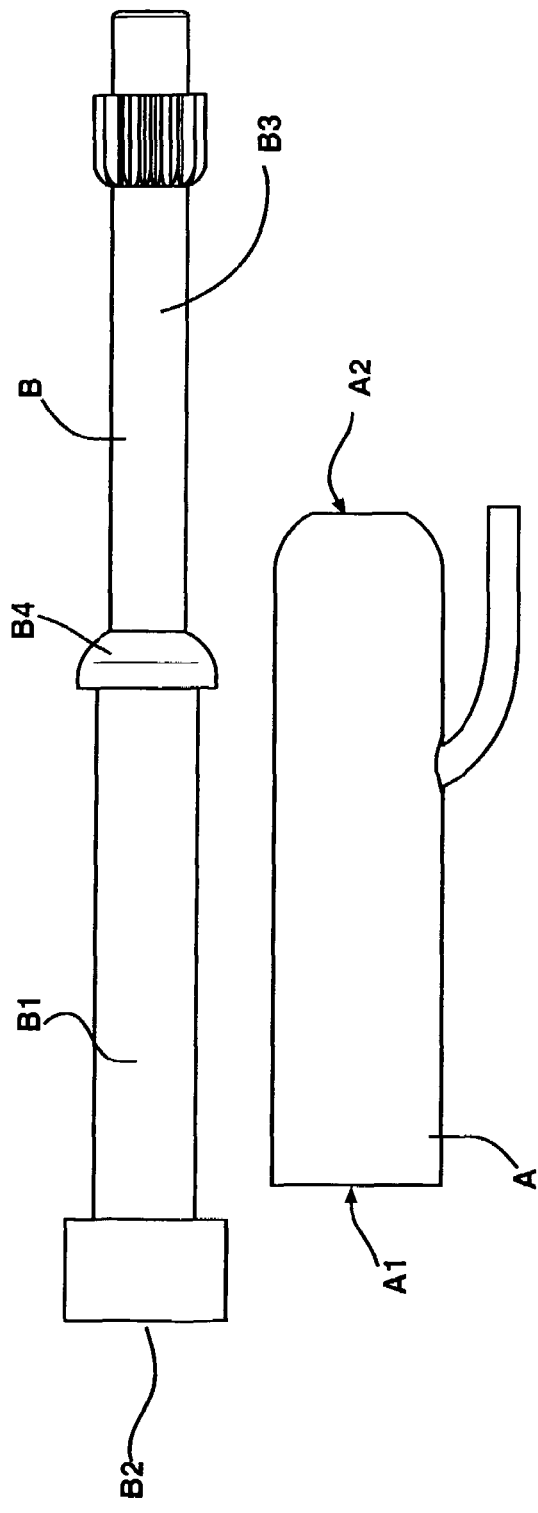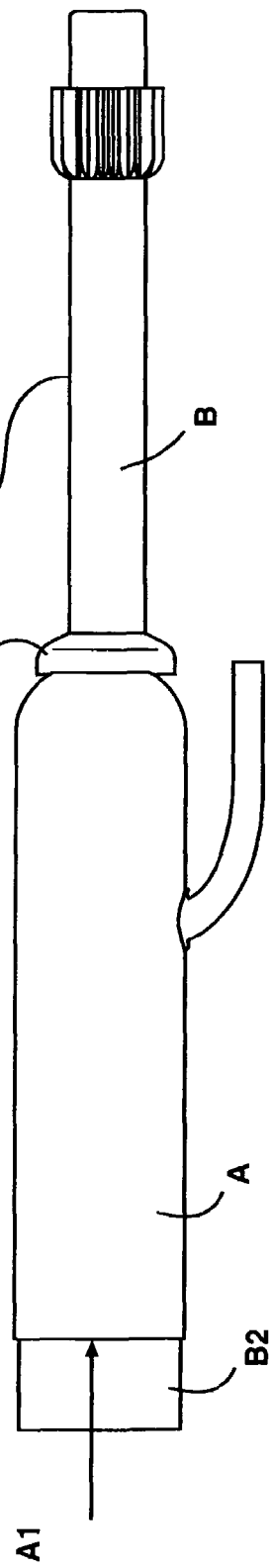
FIG. 1 PRIOR ART
FIG. 2 PRIOR ART

DEVICE FOR INSERTING AND REMOVING MILKING MACHINE LINERS

BACKGROUND OF THE INVENTION

Field of the Invention. The present invention generally relates to vacuum operated milking machines and in particular those vacuum operated milking machines which utilize a rigid shell and a flexible inflation or liner.

Background of the Invention: Modern agriculture combines the use of technology with traditional farming practices to achieve greater yields in the production of food and crops. In the dairy industry, the mechanization of the milking process through the use of so called milking machines has been one of these great advances. These milking machines come in a variety of configurations, however one predominant configuration employs the use of a vacuum connected through tubes to a plurality of teat cup assemblies. Each of these teat cup assemblies is typically made up of a rigid outer shell which is hollow and a resiliently flexible inflation or liner portion which is configured to fit within the hollow rigid outer shell portion.

A typical milking assembly is made up of a device called a claw from which four milking cups extend. Each of these milking cups contain a rigid shell and a flexible inflator. These rigid shell portions are typically made from a strong rigid material such as stainless steel, which is able to withstand the force of the milking parlor including occasionally being kicked or stepped on by a cow. These rigid hard shells contain a tube for connection with the pulse system and an aperture through which a portion of the inflator called the short milk tube extends. This short milk tube is connected to the short milk tubes from the other three milking cups at the claw and a long milk tube extends from the claw to a collection device such as a tank at a distant location. The pulse system is also similarly connected to a long pulse tube, which provides the pulsing vacuum pressure to the milking cup. When the milking cup is connected to the pulsing system the pulsing system applies a vacuum at selected intervals. This alternating application of vacuum pressure through the tube causes the liner to alternatively constrict and relax its position around the teat. This alternative constriction and relaxation causes the liner to rhythmically pulsate, simulating the sucking of a calf upon the teat. This variation in the constriction of the teat by the liner causes milk to flow from the teat and to be collected through the milk tube lines.

The inflations or inner liners are typically made up of a tubular liner portion having one end configured to engage and hold the teat portion of an udder within the device, and a second portion which extends through the hard shell cup portion so as to hold the liner within the milking cup. This inflation is typically made from a resilient but flexible material such as rubber or plastic compositions which are resistant to tearing or cutting by impact. These liners or inflations are the only parts of the milking device which actually come into contact with the animal. Studies have shown that the configuration, construction, fit and placement of the liners upon the teat has a greater effect than almost any other factor in the efficiency of the milking process.

A variety of configurations, designs and formulations for teat liners have been invented. Examples of these various devices are found in U.S. Pat. No. D480,184, U.S. Pat. No. 5,007,378, U.S. Pat. No. 4,315,480, and U.S. Pat. No. 4,459,938. While the configuration and exact placement of these devices varies, all of these liners must be designed to provide certain features. These features include: the ability to provide an airtight joint at both ends of the shell, provide a mouthpiece and a barrel which fit on to the teat to minimize the slipping of the liner and the milking cups, and allow the claw of the milker to be interconnected to a designated location.

Regardless of the type of material that the liner is made from, no teat liner can last forever. Over time these liners will wear out, break or otherwise become useless. In addition, various modifications made to the liners may also cause the dairyman to wish to change out the liners which are in their milking cups.

The frequency at which such a replacement must take place is dependent upon a variety of factors. However, it is estimated that a typical liner will function within a milking machine for approximately 900 to 1800 milkings. After this quantity of milking these liners must be replaced. On the average most milking cup liners must be replaced at about 1200 milkings. Depending upon the size of the operation in which the device is being used, this means that these liners would have to be replaced approximately every 2-3 weeks. In as much as each milking station would require a replacement of 4 such liners, an operation that utilized 50 milking machines would have to replace 200 liners every two or three weeks. This process is typically done by hand and can be quite time consuming and expensive.

In order to insert the inflations or liners in to proper position within the rigid milking cup, the short milk tube portion of the liner must be pulled through an aperture of the base of the rigid milking cup. When the inflation is so positioned, the head of the liner covers the top portion of the rigid cup and the short milk tube is pulled through this smaller aperture at the base of the rigid milking shell. In order to remove the liner from this position, the liner must be pulled with sufficient force so as to pull this rear lip back out through the aperture and remove the liner from its location within the milking shell. Once these liners are removed, the old liners can then be thrown away and a new liner inserted into the hard shell milking cup and pulled through this smaller aperture.

In as much as the configuration of the materials which make up the liners vary, so also the flexibility varies between the liners themselves. This difference in flexibilities at times can be so great as to prevent a party attempting to insert or remove these liners from being able to adequately perform this task. Therefore what is needed is a device which is simply easier to use and which allows an operator to selectively place and remove liners within hard milk shell casings with increased efficiency as compared to currently existing methods which is listed in the prior art. What is also needed is a device which enables a user to simply and effectively remove and insert liners from within the milk casing and hard shell liners. Accordingly, it is an object of the present invention to provide a simple device to operate and to enable a user to selectively insert and remove plastic shell liners from within a hard shell milk cup device. An object of the present invention is to provide a device which will enable a user to place and remove these plastic shell liners from within a hard cup device.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a device for selectively inserting or removing cup liners or inflators from the rigid shell milking cups. The present invention is a device made up of a frame which extends from a first end to a second end along a length with a force applying device connected to this frame. The force-applying device is configured to apply a pre-selected quantity of force in either a first or a second direction. A milking cup holding device configured to hold a portion of a milking cup may also be connected to the frame. A liner connection device is connected to a portion of the force-applying device and has a portion configured to grasp and hold a portion of the liner which is to be removed. An actuator device operatively connected to the force applying device controls the activation of this device so that the liner is pushed or pulled only when desired.

When the device is fully connected and ready for use liners may be inserted or removed from within a hard shell type of milking cup. To insert a liner into a milking cup, the liner is placed within the milking cup and the portion of the liner, usually the short milking tube portion of the liner or the cup portion of the liner, is connected to the liner attachment portion of the device which is in turn connected to the force applying device. The milking cup is positioned against the milking cup holding device in such a way so as to prevent the milking cup from moving in the direction to which the force from the force-applying device is to be moved. In other embodiments the device can also be manually held while the force-applying device exerts a force sufficient so cause the liner to be pushed or pulled through the inner portions of the against the inner portions of the device. The activating device then moves the force applying device so as to cause the force applying device to pull or push the liner out of or into the milking cup.

This device provides a significant advantage over other devices which exist in the prior art and allows for the milk liners to be pulled at a rate which is significantly more rapid than other methods which exist in the prior art which perform this function manually.

In the preferred embodiment the force-applying device is a pneumatic cylinder, made up of a cylinder body and a piston which moves within this cylinder. This piston is connected to a ram, which contains a liner attachment device which is configured to connect and hold a desired part of the liner so as to allow the liner to be pulled into and out of a desired portion within a milking cup.

In the preferred embodiment of the invention the milk liner connection device is made up of a chute having a generally open portion connected to a base. The base is held in sliding engagement against the frame. The base has a generally U-shaped riser extending upward from the base. The U-shaped riser has a bottom and a pair of sides and a stop connected to the bottom and said sides of the riser. Each of the sides of the riser defines a generally L-shaped aperture. This generally L-shaped aperture is configured to receive a pair of rods through this pair of apertures. The rods are connected to an upper clamping plate which is connected to the force applying device so that movement of the pair of rods within the generally L-shaped apertures to alternatively compress or release an item held between one of the pair of rods and the stop allows the liner to be grasped with sufficient strength so as to allow the liner to be pulled into or out of position against the milk shell liner cup.

This invention presents a substantial advantage over the prior art and allows a single person to dramatically reduce the amount of time which is required to install and remove inflators and liners from their designated position within a milking cup type of apparatus.

The purpose of the foregoing Abstract is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

BRIEF DESCRIPTION OF THE DRAWINGS

FIG. 1 is a view of the prior art hard shell milking cup A and the prior art flexible liner B which is configured for insertion within this rigid shell.

FIG. 2 is a view of the pieces A and B shown in FIG. 1 when the liner B is placed within this rigid shell A.

DESCRIPTION OF THE PREFERRED EMBODIMENTS

Figure 3:
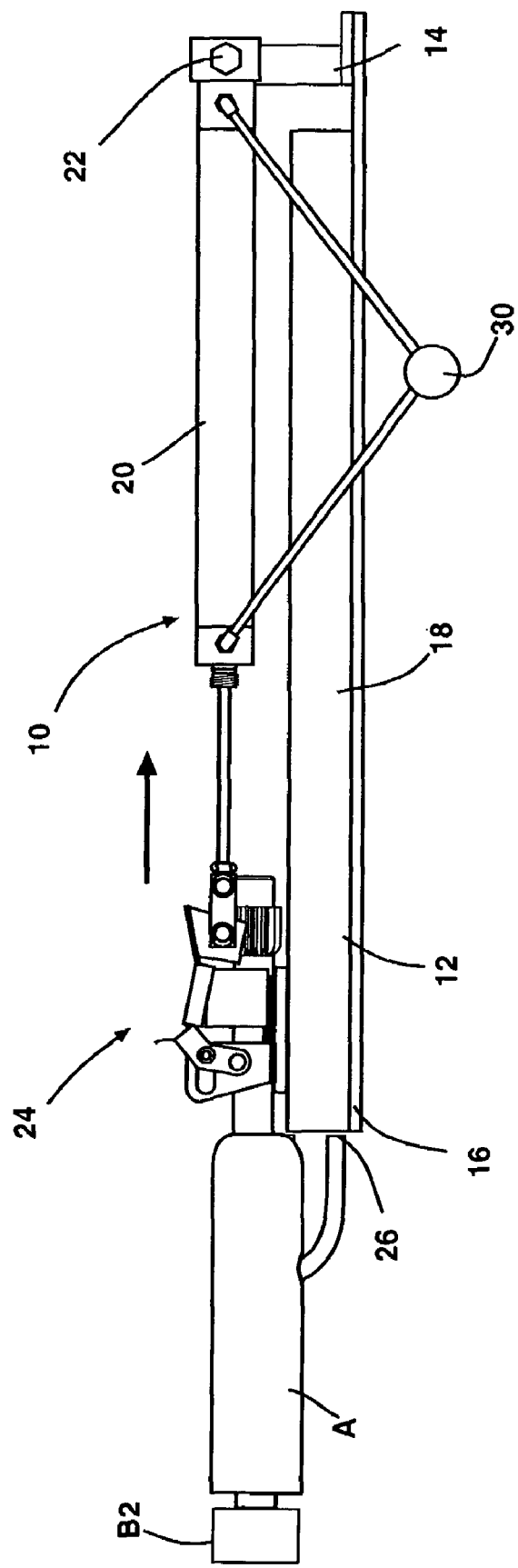
FIG. 3 is a side view of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The present invention is a device for inserting and removing flexible liners from the hard shell milking cups in a milking machine. Referring first to FIGS. 1 and 2, are examples of the prior art, the inflator or liner B and the milk cup A which these devices are used upon are shown. FIG. 1 shows the shell or milk cup A and the flexible inflator B upon which the present invention acts and operates. The rigid shell A is a generally hollow shaped cylinder with an open first end A1 and a more closed second end A2. This second closed end A2 defines an aperture through which a rear lip portion B4 the inflator B must be pulled so as to either insert or remove these inflators B from a connected position within the rigid shells. These inflators B each contain a barrel B1 with a cup B2 positioned near a first end and a second end forming a short milk tube B3. A rear lip portion B4 is positioned between the short milk tube B3 and must be pulled through the opening near the second end of the rigid shell A2 to either remove or insert the liner within the rigid shell A.

Figure 4:
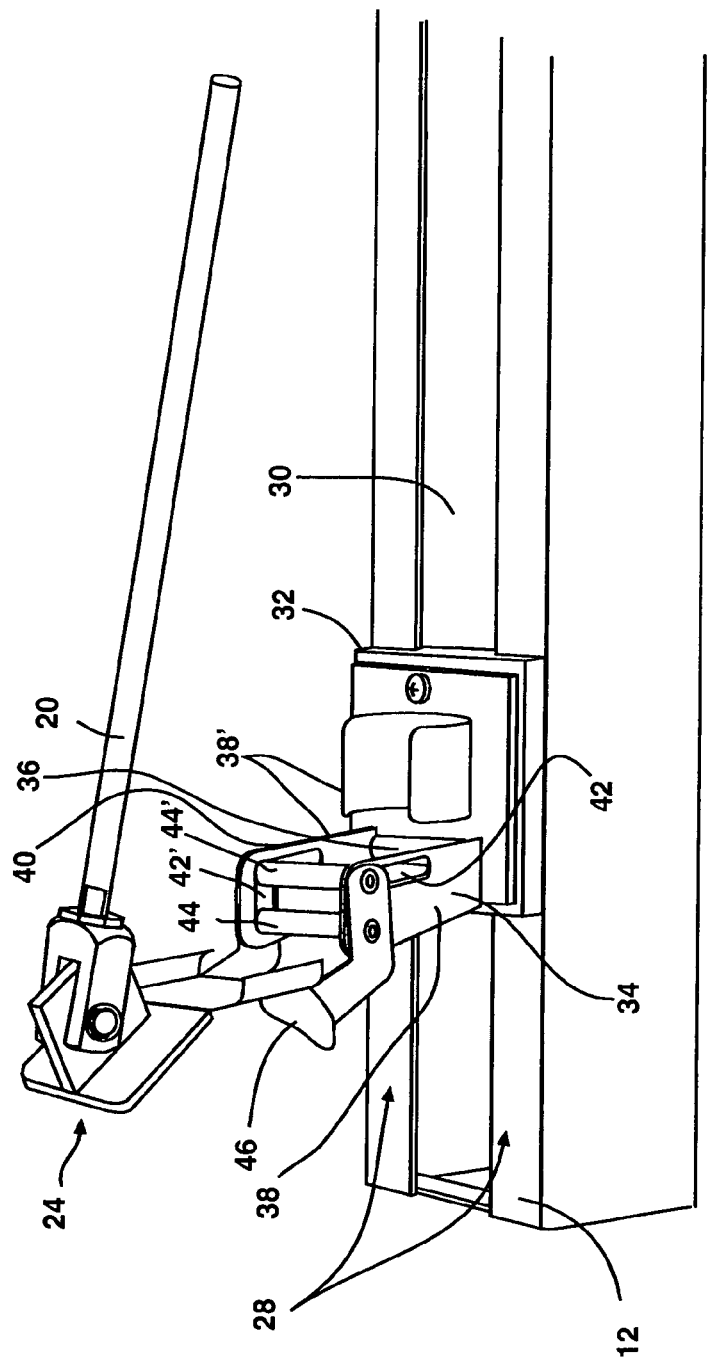
FIG. 4 is a perspective view of the liner connection device of the present invention.

Referring now to FIGS. 3 and 4, the present invention is shown. FIG. 3 shows the preferred embodiment of the present invention 10 while inserting a new liner within a hard milk shell casing. This device 10 is made up of a frame 12, having a first end 14, and extending along a length 18 to a second end 16. The force-applying device 20 is connected to the frame 12. In this preferred embodiment, this force-applying device 20 is a hydraulic or pneumatic cylinder that is pivotally attached to the first end of the frame 12. This pivoting connection allows for the liner connection device 24 to open up into an open position when the ram portion from the force applying device is extended. While the force-applying device 20 is shown as a hydraulic or a pneumatic cylinder it is to be understood that other force producing devices may also be utilized to accomplish the same end namely producing a force sufficient to move the liner B into or out of its designated position within the milking cup A.

In this preferred embodiment, the force-applying device 20 is pivotally connected to the frame 12, through a pivoting connection 22. This force-applying device 20 is configured to apply a first preselected quantity of force in the first direction and a second preselected quantity of force in the second direction. This force-applying device 20 is connected to a liner connection device 24 which is held in a sideable connection with the frame 12. A milk cup holding device 26 is also connected to the frame 12 and serves to prevent the milk cup shell A from being moved in the same direction as the liner B when force is applied to the liner B by the force-applying device 20. The actuator is in the preferred embodiment a two-way switch which allows the piston and the ram of the cylinder 20 to be moved either toward or away from the second end of the device 16 where the rigid milk shell is located.

As is shown in FIG. 4, in the preferred embodiment of the invention, the frame 12 of the invention defines a chute 28 defining a generally open portion 30. The liner connection device 24 is made up of a base 32 that is held in compressive sliding engagement against the frame 12. The base 32 has a generally U shaped riser 34 extending upward from the base 34. The U-shaped riser 34 has a bottom 36 and a pair of sides 38, 38'. The U-shaped riser 34 has a stop 40 connected to the bottom 36 and the sides 38, 38' of the riser 34. Each riser 38, 38' defines a generally L shaped aperture 42 therein. The generally L shaped aperture 42 is configured to receive a pair of rods 44, 44' therein. These rods 44, 44' are connected to an upper clamping plate 46. The upper clamping plate 46 is pivotally connected to the force applying device 20 whereby movement of the force applying device 20 moves the pair of rods within the generally L shaped apertures to alternatively compress and release a portion of the liner between one of the pair of rods 44, 44' and the stop. This movement constitutes the opening and/or closing of this attachment device. This connection device can then be utilized to move the liner connection device in alternatively a first or second direction along the frame.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A device for selectively inserting or removing cup liners having a generally elongated cylindrical body, a front cup and a rear lip from a milking cup apparatus, said device comprising:
   a frame extending from a first end to a second end along a length;
   a force applying device, said force applying device connected to said frame, said force applying device configured to apply a first pre-selected force in a first direction and a second pre-selected force in a second direction;
   a liner connection device configured to connect a portion of a cup liner to said force applying device, wherein said liner connection device comprises a chute having a generally open portion connected to a base, said base held in sliding engagement against said frame, said base having a generally U-shaped riser extending upward from said base, said U-shaped riser having a bottom and a pair of sides, said U-shaped riser having a stop connected to said bottom and said sides of said U-shaped riser each defining a generally L-shaped aperture therein, said generally L-shaped aperture configured to receive a pair of rods therein, said pair of rods connected; to an upper clamping plate, said upper clamping plate connected to said force applying device whereby movement of said force applying device moves said pair of rods within said generally L-shaped apertures to alternatively compress or release an item held between one of said pair of rods and said stop, and to move said liner connection device in alternatively a first or second direction along said frame; and
   an actuator device operatively connected to said force applying device for selectively directing said force applying device to apply a pre-designated quantity of force in a selected direction;
   whereby a liner is connected to said liner connection device and a user activates said actuator device to cause said force applying device to apply a pre-selected quantity of force in a desired direction against said liner so as to selectively insert or remove said liner from said milking cup apparatus.

2. The device of claim 1 wherein said liner connection device is connected in sliding engagement along said frame.

3. The device of claim 1 wherein said force applying device is pivotingly connected to said frame.

4. The device of claim 1 wherein said force applying device is a pneumatic cylinder.

5. The device of claim 1 wherein said force applying device is a hydraulic cylinder.

6. The device of claim 1 wherein said actuator device is a switch.

7. The device of claim 1 wherein said liner connection device utilizes a compressive device to hold said liner.

8. The device of claim 1 wherein said upper clamping plate further comprises an upper lip.

9. A device for selectively inserting or removing cup liners having a generally elongated cylindrical body, a front cup and a rear lip from a milking cup apparatus, said device comprising:
   a frame extending from a first end to a second end along a length;
   a force applying device, said force applying device pivotally connected to said frame, said force applying device configured to apply a first pre-selected force in a first direction and a second pre-selected force in a second direction;

a milking cup holding device connected to said frame, said milking cup holding device configured to hold a portion of a milking cup therein, a liner holding device, connected in sliding engagement along said frame, said liner holding device configured to connect a portion of a cup liner to said force applying device, wherein said liner holding device; comprises a chute having a generally open portion connected to a base, said base held in sliding engagement against said frame, said base having a generally U-shaped riser extending upward from said base, said U-shaped riser having a bottom and a pair of sides, said U-shaped riser having a stop connected to said bottom and said sides of said U-shaped riser each defining a generally L-shaped aperture therein, said generally L-shaped aperture configured to receive a pair of rods therein, said pair of rods connected to an upper clamping plate, said upper clamping plate connected to said force applying device, whereby movement of said force applying device moves said pair of rods within said generally L-shaped apertures to alternatively compress or release an item held between one of said pair of rods and said stop, and to move said liner holding device; in alternatively a first or second direction along said frame; and an actuator device operatively connected to said force applying device for selectively directing said force applying device to apply a pre-designated quantity of force in a selected direction;

whereby when a milking cup apparatus is positioned within said milk cup holding device and said liner holding device is connected to a liner, said actuator device activates said force applying device to apply a pre-selected quantity of force in a desired direction against said liner so as to selectively insert or remove said liner from said milking cup apparatus.

10. The device of claim 9 wherein said force applying device is a pneumatic cylinder.

11. The device of claim 9 wherein said force applying device is a hydraulic cylinder.

12. The device of claim 9 wherein said actuator device is a switch.

13. The device of claim 9 wherein said liner holding device utilizes a compressive device to hold said liner.

14. The device of claim 9 wherein said upper clamping plate further comprises an upper lip.

* * * * *